United States Patent Office 3,408,388
Patented Oct. 29, 1968

3,408,388
PROCESS FOR PREPARING ESTERS OF UNSATURATED ALCOHOLS FROM MONOESTERS OF SATURATED 2,2,4-TRISUBSTITUTED-1,3-DIOLS
Hugh John Hagemeyer, Jr. and Howard Nolan Wright, Jr., Longview, Tex., assignors to Eastman Kodak Company, Rochester, N.Y., a corporation of New Jersey
No Drawing. Continuation-in-part of abandoned application Ser. No. 331,092, Dec. 17, 1963, which is a continuation-in-part of abandoned application Ser. No. 122,638, July 10, 1961. This application May 24, 1966, Ser. No. 552,420
10 Claims. (Cl. 260—491)

This application is a continuation-in-part of our co-pending application Serial No. 331,092 filed December 17, 1963, now abandoned which was co-pending with and a continuation-in-part of our application Serial No. 122,638, filed July 10, 1961, now abandoned.

This invention relates to the chemical arts. More particularly, it relates to the preparation of organic chemical compounds referred to as esters.

Esters are a well-known class of organic chemical compounds characterized by a particular molecular arrangement, the graphic formula of which is

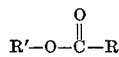

Wherein R'—O— is an alcohol moiety and

is a carboxylic acid moiety with R' being an organic radical and R being a radical selected from the group consisting of hydrogen and organic radicals.

This invention broadly involves a process for the preparation of esters represented by the formula:

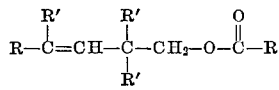

wherein each R is a radical independently selected from the group consisting of hydrogen and R' radicals and each R' is a radical independently selected from the group consisting of alkyl, cycloalkyl, aryl, alkylaryl and arylalkyl. These esters thus defined are generically referred to herein as carboxylic acid esters of unsaturated 2,2,4-trisubstituted alcohols or simply as esters of unsaturated 2,2,4-trisubstituted alcohols. Preferably, R' is an alkyl group having up to about eight carbon atoms.

Esters of unsaturated 2,2,4-trisubstituted alcohols have utility as intermediates in the preparation of other organic materials useful as synthetic lubricants and plasticizers. Thus, these esters can be reduced and converted to the corresponding alcohols which are useful as synthetic lubricants and plasticizers. Also, esters of unsaturated 2,2,4-trisubstituted alcohols can be reacted further as by the oxo reaction to produce esters of hydroxy aldehydes, such as 6-isobutyroxy-3,5,5-trimethylhexanal, which are useful as intermediates in the preparation of synthetic lubricants, plasticizers and polyesters. Hence, these esters of unsaturated 2,2,4-trisubstituted alcohols are useful compounds.

Heretofore, these esters of unsaturated 2,2,4-trisubstituted alcohols have been synthesized by a process which comprises completely esterifying the corresponding saturated 2,2,4-trisubstituted-1,3-diol (or glycol) with a carboxylic acid to form the diester and then thermally cracking or pyrolysing the diester to the ester of the unsaturated 2,2,4-trisubstituted alcohol. This process is described in the U.S. Patent No. 2,941,011, to Hagemeyer et al.

This process, however, has several disadvantages. One disadvantage resides in the large quantity of carboxylic acid, which must be employed to obtain complete esterification of the glycol and which subsequently must be recovered if a substantially pure end product is desired and/or if the economics of the process require reuse of the acid. Another disadvantage resides in the fact the thermal cracking step requires high temperatures (300°– 600° C. being mentioned in the Hagemeyer et al. patent) and short contact times (0.01 second to 10 seconds being disclosed in this patent). These process conditions call for rather specialized, expensive equipment with careful control and frequent regulatory attention by skilled personnel.

Accordingly, there is a need for a process for preparing esters of unsaturated 2,2,4-trisubstituted alcohols, which avoids these disadvantages. An object of this invention is to satisfy this need.

At this point it might be thought that one way to make these esters of unsaturated 2,2,4-trisubstituted alcohols is to react an organic acid with the parent unsaturated 2,2,4-trisubstituted alcohol. The problem here, however, is in obtaining the parent unsaturated 2,2,4-trisubstituted alcohol. Such alcohols are not readily obtainable. On the other hand the corresponding saturated 2,2,4-trisubstituted-1,3-diols are readily obtainable. However, as reported by Perry et al., J. M. Chem. Soc., 80, 3618 (1958), attempts to dehydrate 2,2,4-trisubstituted-1,3-diols in the presence of acid catalysts produced only substituted furans and 2,3,4-trisubstituted aldehydes with no conversion to the unsaturated alcohols. Apparently, 2,2,3-trisubstituted-1,3-diols can be dehydrated in the presence of acid catalysts but 2,2,4-trisubstituted-1,3-diols cannot. Consequently, preparation of esters of unsaturated 2,2,4-trisubstituted alcohols by esterification of the parent unsaturated 2,2,4-trisubstituted alcohols does not now appear commercially feasible. Hence, an object of this invention is to provide a process for preparing esters of unsaturated 2,2,4-trisubstituted alcohols other than by the esterification of the parent alcohols.

As just mentioned, saturated 2,2,4-trisubstituted-1,3-diols are readily obtainable. They are easily synthesized by the aldol condensation of the corresponding alpha-substituted aliphatic aldehyde followed by reduction of the aldol to the glycol. Monoesters of these glycols can be prepared by partial esterification with carboxylic acids, their anhydrides or their chlorides with esterification occurring predominantly at the primary hydroxyl group. These monoesters can also be obtained by the trimeric condensation of readily available alpha, alpha-disubstituted acetaldehydes in the presence of a basic catalyst such as, for example, an alkali metal alkoxide, as described in U.S. Patent 3,091,632. Hence, these monoesters are readily obtainable materials. Another object of this invention is to provide a process for the preparation of esters of unsaturated 2,2,4-trisubstituted alcohols from the corresponding monoesters of saturated 2,2,4-trisubstituted-1,3-diols.

A further object of this invention is to provide such a process which is commercially practical, which is economical and which is inherently simple.

These and other objects are achieved by this invention.

In summary, this invention comprises a process based on the discovery that carboxylic acid esters of unsaturated 2,2,4-trisubstituted alcohols are synthesized by subjecting the corresponding monoesters of saturated 2,2,4-trisubstituted-1,3-diols to catalytic dehydration with certain compounds as dehydration catalysts. It has been discovered that catalytic dehydration is accomplished at high yields and conversions by contacting under certain easily controlled and regulated temperatures and time conditions a saturated 2,2,4-trisubstituted glycol monoester (represented by the following generic formula) with a catalytic quantity of a highly acidic, non-volatile compound. The highly acidic, non-volatile compounds that can be employed in the invention are sulfuric acid, alkyl and aryl sulfates, alkyl and aryl sulfonic acids, phosphoric acid, alkyl and aryl phosphates, alkyl and aryl phosphonic acids, alkyl and aryl phosphinic acids, pyrophosphoric acid, metaphosphoric acid and acetylsulfoacetic acid. Representative examples of these compounds are ethyl sulfate, benzyl sulfate, methane-sulfonic acid, paratoluene sulfonic acid, chloronaphthalene-sulfonic acid, ethyl phosphate, phenyl phosphate, methyl phosphonic acid, phenyl phosphonic acid, trifluoromethanephosphonic acid, and dibenzylposphinic acid. Acetyl sulfoacetic acid is prepared according to the procedure set forth in U.S. Patent 2,411,823. Preferably, the above alkyl groups, which may be substituted, are lower alkyl of from 1 to 4 carbon atoms and the aryl groups are substituted phenyl and naphthalene radicals. A preferred group of specific dehydrating catalysts are sulfuric acid, p-toluene-sulfonic acid, naphthalene sulfonic acid, phosphoric acid and pyrophosphoric acid. Of course, the use of a compound which is hydrolyzed in the process to an acid of the type mentioned herein is to be considered within the scope of the invention.

As stated above Perry et al. found that 2,2,4-trisubstituted-1,3-diols could not be dehydrated with acid catalysts to yield the unsaturated esters shown in column 1. Whitmore, Organic Chemistry, Van Nostrand Co., p. 128 (1937) and Whitmore, J. Am. Chem. Soc., 54, 3279 (1939) disclose that all reagents, including dehydrating agents, which would be expected to remove or replace the hydroxyl group from neopentyl alcohol gave little or none of the expected product, but caused rearrangement of the neopentyl structure. In the second of the Whitmore references cited above, on page 3280, it is disclosed that dehydration of isopropyl-tertiary-butylcarbinol gave none of the expected product, 2,2,4-trimethylpentene-3. Thus, it was surprising to discover that the acyloxy derivatives of similar neopentyl alcohols could be dehydrated according to our novel process as shown below. The unexpectedness of our process is readily apparent from the chemical reactions diagrammed below.

Invention

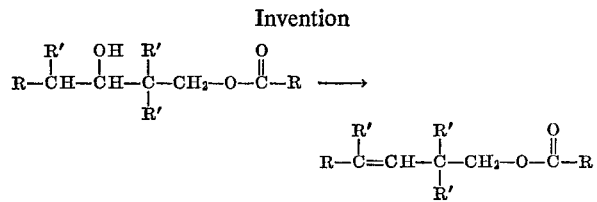

wherein R and R' are as defined above;

Prior art Whitmore

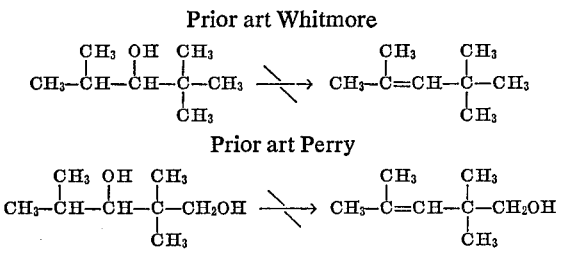

Prior art Perry

From the above reactions, it can be seen that applicants obtain the desired 2,2,4-trisubstituted-ester when a monoester of a 2,2,4-trisubstituted-1,4-diol is dehydrated according to their novel process. It can also be seen that Whitmore and Perry et al. were not able to obtain a product similar to that obtained from applicants' process by the dehydration of alcohols and glycols very similar to the glycol monoesters employed in the invention.

When the process of our invention is considered in view of the prior art represented by the Whitmore and Perry et al. references cited above, it is apparent that the dehydration of a monoester of a 2,2,4-trisubstituted-1,3-diol to yield the unsaturated ester shown in column 1 was not predictable. Thus, the discovery that unsaturated esters could be prepared by the acid catalyzed dehydration of monoesters of 2,2,4-trisubstituted-1,3-diols was unexpected in view of the inability of Perry et al. and Whitmore to obtain similar unsaturated compounds from the alcohols and glycols of which the monoesters used in the invention are derivatives.

The saturated 2,2,4-trisubstituted glycol monoesters employed in the process of this invention are represented by the generic formula:

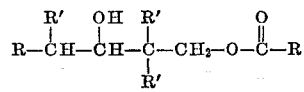

wherein each R is a radical independently selected from the group consisting of hydrogen and R' radicals and each R' is a radical independently selected from the group consisting of alkyl, cycloalkyl, aryl, alkylaryl and arylalkyl radicals. The R and R' radicals in this formula are identical to the respective R and R' radicals at molecularly corresonding positions in the formula set out at the beginning of this specification for the esters of unsaturated 2,2,4-trisubstituted alcohols. Especially preferred 2,2,4-trisubstituted glycol monoesters for use in the process of our invention are those of the foregoing formula in which R' is lower alkyl, e.g., alkyl of 1 to about 4 carbon atoms. Typical saturated glycol monoesters represented by this graphic formula and employed in the process of this invention are:

3-hydroxy-2,2-dimethylhexyl acetate
3-hydroxy-2,2,4-trimethylpentyl acetate
2-ethyl-3-hydroxy-2-methylhexyl acetate
3-hydroxy-2,2,4-trimethylpentyl isobutyrate
2-ethyl-3-hydroxy-2,4-dimethylhexyl 2-methylbutyrate
2-butyl-2,4-diethyl-3-hydroxyoctyl 2-ethylhexoate
2,4-diethyl-3-hydroxy-2-isobutylheptyl 2-ethyl-4-
 methylpentoate
3-hydroxy-2,2,4-triethylhexyl 2-ethylbutyrate
2-cyclohexyl-3-hydroxy-2,4-dimethylhexyl 2-cyclohexyl-
 propionate
3-hydroxy-2,2,4-tricyclohexylbutyl 2,2-dicyclohexyl
 acetate
2-methyl-3-hydroxy-2,4-di(para-methylphenyl)-pentyl
 2(para-methylphenyl)propionate
3-hydroxy-2,2,4,4-tetra(para-methylphenyl)butyl 2,2-
 di(para-methylphenyl)acetate Other glycol monoesters represented by the graphic formula can be used under the concepts of this invention and will be readily recognized by those in the exercise of ordinary skill in the art.

These saturated monoesters of 2,2,4-trisubstituted-1,3-diols can be prepared by the partial esterification of the corresponding glycols, a number of which are, as mentioned in a preceding paragraph, easily synthesized by the aldol condensation of the corresponding alpha-substituted aliphatic aldehyde followed by reduction of the aldol to the glycol. Preferably, however, they are obtained by the trimeric condensation of a corresponding alpha-substituted aliphatic aldehyde in the presence of a basic catalyst, such as, for example, an alkali metal alkoxide. Crude glycol monoester from the condensation reaction is washed and the unreacted aldehyde recovered as by azeotropic distillation or by other suitable ways. The stripped crude glycol monoester is then decanted, and if desired, is used in the process of this invention without further purification. On the other hand, the condensation products can be separated by distillation and only the purified glycol monoester employed in the process of this invention.

The dehydration catalyst functions under the conditions of the process of this invention to cause the glycol monoester to dehydrate and become unsaturated at the 3 position of the resultant 2,2,4-trisubstituted alcohol moiety. As mentioned above, the phosphorous and sulfur compounds that are useful dehydration catalysts in our process are characterized by being highly acid and nonvolatile under the reaction conditions of the process. Volatile compounds such as strong halogen acids, even if they are effective as dehydration catalysts, are to be avoided under the concepts of this invention. The members of the group of specific dehydration catalysts are somewhat exclusive in effect inasmuch as other nonvolatile compounds such as potassium acid sulfate, oxalic acid, boric acid, silica gel, alumina and zinc chloride are not effective under the conditions of this invention.

Concentration of the dehydration catalyst is preferably at least that which will cause dehydration in 2 to 24 hours, desirably 4 to 8 hours, at the reaction temperature involved. An excessive concentration of dehydration catalyst promotes a competing ester interchange reaction and thus high conversions to the glycol and glycol diester with resulting decreased yields of the desired ester of an unsaturated 2,2,4-trisubstituted alcohol. Hence, the concentration of the dehydration catalyst is established and maintained as low as practicable. Of course, too low a concentration of the dehydration catalyst results in a dehydration reaction which is too slow to be practical. In general, satisfactory results are obtained with the catalyst concentration being in a range substantially from 0.03 to 3% by weight of the glycol monoester.

Reaction temperature is an important aspect of this invention. In general, the temperature of dehydration is established and maintained below the boiling point of the saturated glycol monoester. Preferably, the temperature of dehydration is established and maintained in a range substantially from 90 to 160° C. with the optimum range being substantially from 110 to 135° C. At a dehydration temperature below 90° C. the conversion of glycol monoester to the corresponding ester of an unsaturated alcohol is very low and the glycol monoester is converted by ester interchange to an equilibrium mixture of glycol, glycol monoester and glycol diester. At a dehydration temperature above 160° C. the dehydration of the glycol monoester is nearly complete but the principal products of the reaction include the ester of the unsaturated alcohol, the acid, substituted tetrahydrofurans and other products which are formed by an initial cracking or rearrangement reaction.

Temperature control can be achieved by carrying out the dehydration reaction of this invention in the liquid phase with an inert diluent, in the liquid phase at subatmospheric pressure, in the vapor phase at atmospheric pressure or in the vapor phase at subatmospheric pressure. Each of these techniques is particularly suited to the controlling of reaction temperature. However, for ease and economy of operation it is preferred to conduct the dehydration reaction in the liquid phase with a diluent. Since the boiling point of the reaction mixture is governed by the concentration of the diluent, regulation of the concentration of the diluent in the reaction mixture is a convenient way of controlling the reaction temperature. A diluent which boils near or above the desired reaction temperature can be used if the boiling point of the reaction mixture is controlled by establishing and maintaining the pressure in the reactor at a value less than one atmosphere. It is preferred to use a diluent which is inert under the reaction conditions of this process, which is insoluble in water and which forms an azeotrope with water. Examples of suitable diluents are benzene, toluene, isobutyl isobutyrate, hexane and cyclohexane.

In performing a preferred embodiment of the process of this invention under liquid phase and diluent conditions, the glycol monoester, diluent and dehydration catalyst are mixed at ambient temperature in the proportions which will result in a dehydration temperature of substantially 90–160° C. and usually substantially 110–135° C. This mixture is then introduced into a suitable dehydration reactor. Such a reactor is a vessel fitted with an overhead condenser, overhead condensate decanter and means for heating the contents of the dehydration reactor to the boiling point. The temperature of the mixture in the reactor is established and maintained at the boiling point, usually 110–135° C., until substantially all the water resulting from the dehydration reaction is removed as an azeotrope with the diluent. The water is separated from the diluent continuously in the decanter and the diluent is returned to the reactor. At the conclusion of the reaction, which is evidenced by the fact no more water collects in the decanter at reflux temperature, the reaction mixture is cooled and then discharged from the reactor. The crude product preferably is worked up as by washing with water or with an aqueous solution of a weak base such as, for example, sodium carbonate. The essentially pure ester of the unsaturated alcohol preferably is then obtained as by distillation preferably at subatmospheric pressure.

The process of this invention can be carried out on a continuous basis. This is accomplished by introducing glycol monoester and a quantity of dehydration catalyst of the group equal to substantially 0.03 to 3% by weight of the monoester into a reactor with a packed distillation column. The reactor forms a reaction zone. The temperature of the resulting reaction mixture is established and maintained in a range of substantially 100–160° C., but below the boiling point of the glycol monoester. As a result dehydration of the glycol monoester occurs and the corresponding unsaturated ester and water are formed. The water and unsaturated ester distill off from the reaction mixture and are collected. As this takes place glycol monoester is introduced into the reactor at a flow rate at which a substantially constant level of reaction mixture is established and maintained in the reactor.

This invention is further illustrated by the following examples of various aspects of this invention, including specific embodiments thereof. This invention is not limited to these embodiments unless otherwise indicated.

EXAMPLE 1

This example illustrates the synthesis according to this invention of a 2,2-dimethyl-3-hexenyl ester.

A mixture of 500 milliliters of toluene, 400 milliliters (2.00 moles) of 3-hydroxy-2,2-dimethylhexyl acetate and 0.3 milliliter (0.0054 mole) of concentrated sulfuric acid is introduced into the base of a dehydration reactor. This dehydration reactor comprises a 10-bubble plate column fitted with an overhead condenser and decanter and a base distilling flask fitted with a thermowell and heated by an electric mantle. The mixture is refluxed in the flask at a flask temperature of 125–130° C. At the end of 4.5 hours it is typical for no more water to collect in the decanter, thus indicating dehydration is essentially complete.

The reaction mixture is cooled, neutralized, washed and distilled at atmospheric pressure. The product thus obtained, which consists essentially of the ester of the unsaturated 2,2,4-trisubstituted alcohol, distills typically at 186–189° C. and weighs 298.3 grams (1.755 moles). This ester, 2,2-dimethyl-3-hexenyl acetate, can be identified by saponification equivalent and comparison of the physical properties of it and of an authentic sample. A typical yield of this ester is 87.8 mole percent.

EXAMPLE 2

This example illustrates the synthesis according to the process of this invention of a 2-ethyl-2-methyl-3-hexenyl ester.

A mixture of 500 milliliters of toluene, 400 milliliters (1.86 moles) of 2-ethyl-3-hydroxy-2-methylhexyl acetate and 0.3 milliliter (0.0054 mole) of concentrated sulfuric acid are introduced into the base flask of the equipment of Example 1. The mixture is heated to reflux temperature. Dehydration is generally essentially complete in 6 hours at a base temperature of 128–133° C.

The reaction mixture is cooled, neutralized, washed and distilled at reduced pressure. The product thus obtained consists essentially of the ester of the unsaturated alcohol, 2-ethyl-2-methyl-3-hexenyl acetate. The product distills typically at 90–100° C. at a pressure of 4 millimeters of mercury and typically weighs 310 grams (1.685 moles). The ester can be identified by saponification equivalent and comparison of physical properties of it and an authentic sample. A typical yield of this ester of an unsaturated 2,2,4-trisubstituted alcohol is 90.8 mole percent.

EXAMPLE 3

This example illustrates the synthesis according to this invention of 2,2,4-trimethyl-3-pentenyl isobutyrate from 3-hydroxy-2,2,4-trimethylpentyl isobutyrate.

A mixture of 300 milliliters of toluene, 400 milliliters (1.74 moles) of 3-hydroxy-2,2,4-trimethylpentyl isobutyrate and 0.3 milliliter (0.0054 mole) of concentrated sulfuric acid are fed into the base of the dehydration reactor of Example 1. The mixture is heated to reflux temperature and refluxed for 7 hours. During this time the base or reaction temperature typically rises from 130–138° C. while 29.5 milliliters (1.64 moles) of water typically are collected in the overhead decanter. Dehydration is essentially complete in 7 hours as evidenced by the fact substantially no more water collects in the overhead trap.

The reaction mixture is cooled, washed with dilute sodium carbonate and water, then distilled at reduced pressure. The product thus obtained consists essentially of 2,2,4 - trimethyl - 3 - pentenyl isobutyrate. The product typically distills at 78–82° C. at 5 millimeters mercury pressure and weighs 297 grams (1.50 moles). This represents a yield of 86.2 mole percent. Identification of this product can be accomplished by the determination of saponification equivalent and by comparison of physical properties of it with an authentic sample.

EXAMPLE 4

According to the procedure set forth in Example 3, a mixture of 300 ml. toluene, 400 ml. (1.74 moles) 3-hydroxy - 2,2,4 - trimethylpentyl isobutyrate and a catalyst shown in the table below were refluxed until the formation of water is completed. The following table shows the high yields of desired product that are obtained from our novel process:

TABLE I

| Catalyst | Moles Catalyst | Dehydration Time, hours | Mole Percent Yield to Trimethylpentenyl-Isobutyrate |
| --- | --- | --- | --- |
| Paratoluene Sulfonic Acid | 0.0116 | 9 | 90.2 |
| Ortho-Phosphoric Acid | 0.020 | 11.5 | 87.5 |
| Pyrophosphoric Acid | 0.01 | 8.5 | 88.1 |
| Chloronaphthalene Sulfonic acid | 0.01 | 7.5 | 90.6 |
| Acetyl Sulfoacetic Acid | 0.01 | 7.5 | 86.9 |
| Trifluoromethane Phosphonic Acid | 0.01 | 9 | 87.1 |
| Fused KHSO$_4$ | 0.10 | 24 | 0.1 |
| Zinc | 0.10 | 24 | 0.1 |
| Oxalic Acid | 0.10 | 24 | 0.1 |
| Boric Acid | 0.10 | 24 | 0.1 |

From this table, it can also be seen that many compounds ordinarily used as dehydration catalysts do not dehydrate 3-hydroxy-2,2,4-trimethylpentyl isobutyrate.

EXAMPLE 5

This example illustrates the influence of a lower than optimum temperature in the synthesis according to this invention of 2,2,4-trimethyl-3-pentenyl isobutyrate from 3-hydroxy-2,2,4-trimethylpentyl isobutyrate.

A mixture of 300 milliliters of benzene, 400 milliliters (1.74 moles) of 3-hydroxy-2,2,4-trimethylpentyl isobutyrate and 0.3 milliliter (0.0054 mole) of concentrated sulfuric acid are fed into the dehydration reactor described in Example 1. The mixture is refluxed for 2 hours. A typical base or reaction temperature is 99° C. During this time generally no water collects in the overhead decanter. Fifty milliliters of benzene are then removed from the mixture by distillation. Typically the reaction temperature rises to 110° C. The mixture is refluxed for 24 hours while typically 18 milliliters (1.0 mole) of water collect in the overhead decanter.

The reaction mixture is cooled, washed with dilute sodium carbonate and water and then distilled at reduced pressure. The crude product is thereby separated into fractions which typically comprise 250 milliliters of a benzene fraction, 190.1 grams (0.96 mole) of a fraction consisting essentially of the ester of the unsaturated 2,2,4-trisubstituted alcohol (2,2,4-trimethyl-3-pentenyl isobutyrate), which fraction boils at 92–95° C. at 10 millimeters mercury pressure, 27.7 grams (0.190 mole) of a fraction consisting essentially of the glycol (2,2,4-trimethylpentyl-1,3-diol), which fraction boils at 102–105° C. at 10 millimeters mercury pressure, 75.2 grams (0.398 mole) of a fraction consisting essentially of the glycol monoester (3 - hydroxy - 2,2,4-trimethylpentyl isobutyrate), which fraction boils at 125–128° C. at 10 millimeters, and 59.0 grams (0.206 mole) of a fraction consisting essentially of the glycol diester (2,2,4-trimethylpentyl-1,3-diisobutyrate), which fraction boils at 140–150° C. at 10 millimeters mercury pressure. Identification of these products can be accomplished by hydroxyl determination, saponification and comparison of physical properties of the fractions with those of authentic samples. A typical yield of the ester of the unsaturated 2,2,4-trisubstituted alcohol is 68.8 mole percent while a typical yield of the ester interchange products is 28.4 mole percent.

EXAMPLE 6

This example illustrates the influence of a higher than optimum temperature in the synthesis according to this invention of 2,2,4-trimethyl-3-pentenyl isobutyrate from 3-hydroxy-2,2,4-trimethylpentyl isobutyrate.

A mixture of 300 milliliters of isobutyl isobutyrate, 400 milliliters (1.74 moles) of 3 - hydroxy-2,2,4-trimethylpentyl isobutyrate and 5 grams (0.029 mole) of paratoluenesulfonic acid is charged into the dehydration reactor described in Example 1. The mixture is heated to boiling, producing a reaction temperature typically of 160–162° C. Dehydration is typically essentially complete in 5 hours.

The reaction mixture is cooled, washed and distilled at atmospheric pressure. There is thus obtained a product typically weighing 68.5 grams (0.54 mole) and typically boiling at 120–135° C. This product consists essentially of tetramethyltetrahydrofuran. The remaining reaction mixture is then distilled at reduced pressure (10 millimeters, mercury) to give typically 300 milliliters of a fraction consisting essentially of isobutyl isobutyrate, which fraction boils at 38–42° C., 101.5 grams (0.513 mole) of a fraction consisting essentially of the ester of the unsaturated 2,2,4-trisubstituted alcohol (2,2,4-trimethyl-3-pentenyl isobutyrate), 14.8 grams (0.10 mole) of a fraction consisting essentially of the glycol 2,2,4-trimethylpentyl-1,3-diol and 142 grams (0.49 mole) of a fraction consisting essentially of the glycol diester (2,2,4-trimethylpentyl-1,3-diisobutyrate. A typical yield of the desired product, the ester of the unsaturated 2,2,4-trisubstituted alcohol, is 29.5 mole percent. A typical yield of the dehydration plus rearrangement product (tetramethyltetrahydrofuran) is 30.8 mole percent. A typical yield of the ester interchange products (the glycol and the glycol diester) is 34.3 mole percent. The isobutyl isobutyrate did not react under these conditions.

EXAMPLE 7

This example illustrates the synthesis according to this invention of a 2-ethyl-2,4-dimethyl-3-hexenyl ester from 2-ethyl-3-hydroxy-2,4-dimethylhexyl ester.

A mixture of 500 milliliters of toluene, 300 milliliters (1.10 moles) of 2-ethyl-3-hydroxy-2,4-dimethylhexyl 2-methylbutyrate and 1 milliliter (0.018 mole) of concentrated sulfuric acid are charged into the dehydration reactor described in Example 1. The mixture is heated to reflux temperature. The mixture is refluxed for 2.5 hours at a reaction temperature of 120–125° C.

At the end of this time, dehydration being typically essentially complete, the reaction mixture is cooled, washed and distilled at reduced pressure. The product thus obtained, consists essentially of the ester of the unsaturated 2,2,4-trisubstituted alcohol (2 - ethyl - 2,4 - dimethyl - 3 - hexenyl 2-methylbutyrate). The product distills typically at 100–110° C. at 3 millimeters mercury pressure and typically weighs 235.5 grams (0.981 mole). Identification of this product can be accomplished by saponification equivalent and comparison of its physical properties with those of an authentic sample. A typical yield of the ester of the unsaturated 2,2,4-trisubstituted alcohol is 89.1 mole percent.

EXAMPLE 8

This example illustrates the practice of the process of this invention on a continuous basis.

An initial charge of 2.5 liters of the glycol monoester, 3-hydroxy-2,2,4-trimethylpentyl isobutyrate, and 3.8 milliliters (0.3 weight percent) of concentrated sulfuric acid is introduced to the base heater of a packed distillation column. Heat is applied to the charge and distillation pressure is lowered to 15–25 millimeters of mercury. When the base temperature has reached 125–130° C., glycol monoester is run into the base heater at an average rate of 350 milliliters per hour. At this flow rate a constant level of reaction mixture and a catalyst concentration of 0.2–0.3 weight percent are established and maintained in the base heater. In this run the total charge of glycol monoester is 9 liters (39.25 moles). Water and reaction products are continuously distilled overhead as they form, the temperature at the top of the column typically being 90–110° C. At the end of this run a crude product is obtained which typically weighs 5880 grams and which contains at a concentration of about 86% by weight of the product the ester of the unsaturated 2,2,4-trisubstituted alcohol (2,2,4-trimethyl-3-pentenyl isobutyrate).

On redistillation of the crude product to which has been added the washed contents of the base heater, 5057 grams (25.54 moles) of the ester of the unsaturated 2,2,4-trisubstituted alcohol typically distill over at 78–82° C. at 5 millimeters mercury pressure and 2359 grams (10.93 moles) of unreacted glycol monoester typically distill over at 110–120° C. at 5 millimeters mercury pressure. Hence, conversion of the glycol monoester is typically about 72 mole percent while the yield of ester of the unsaturated alcohol is typically 90.2 mole percent. Without further purification the ester of the unsaturated 2,2,4-trisubstituted alcohol is suitable for further reaction, such as hydrogenation to isobutanol and 2,2,4-trimethylpentanol.

EXAMPLE 9

This example illustrates the vapor phase operation of our process.

The glycol monoester, 3-hydroxy-2,2,4-trimethylpentyl isobutyrate, was passed over a catalyst bed. The vaporizer and catalyst bed were maintained at subatmospheric pressure to provide a vapor phase reaction. The product was neutralized, washed and distilled. The yield to 2,2,4-trimethyl-3-pentenyl isobutyrate is calculated from the weight of the fraction which boils at 77–82° C. at 5 mm. mercury pressure and the weight of unreacted glycol monoester, which boils at 128–132° C. at 5 mm. mercury pressure. Contact time is calculated in the usual way, based on the volume of the empty catalyst tube. The results of five runs and the catalyst and reaction conditions employed in each of the runs are shown in the following table:

TABLE II

| Run | Catalyst | Temp., °C. | Pressure, mm. Hg | Time, sec. | Mole Percent Yield to Trimethylpentenyl Isobutyrate |
|---|---|---|---|---|---|
| 1 | Silica Gel | 155 | 40 | 0.45 | 0.1 |
| 2 | Silica Gel Containing 0.4% triethyl phosphate. | 142 | 8 | 0.17 | 64.0 |
| 3 | Alumina | 150–300 | 15 | 0.2–0.4 | 0.1 |
| 4 | H₃PO₄ on Alumina. | 135 | 20 | 0.38 | 66.7 |

By following the steps under conditions similar to those to these examples the glycol monoester 3-hydroxy-2,2,4-trimethylpentyl acetate is converted to 2,2,4-trimethyl-3-pentenyl acetate; 2-ethyl-3-hydroxy-2,4-dimethylhexyl acetate is converted to 2-ethyl-2,4-dimethylhexenyl acetate; 2-butyl-2,4-diethyl-3-hydroxyoctyl 2-ethylhexoate is converted to 2-butyl-2,4-diethyl-3-octenyl 2-ethylhexoate; 2,4 - diethyl-3-hydroxy-2-isobutylheptyl 2-ethyl-4-methylpentoate is dehydrated to 2,4-diethyl-2-isobutyl-3-heptenyl 2-ethyl-4-methylpentoate; 3-hydroxy-2,2,4-trimethylhexyl 2-ethylbutyrate is converted to 2,2,4-trimethyl-3-hexenyl 2-ethylbutyrate; 2-cyclohexyl-3-hydroxy-2,4-dimethylhexyl 2-cyclohexylpropionate is converted to 2-cyclohexyl - 2,4 - dimethyl-3-hexenyl 2-cyclohexylpropionate; 3-hydroxy-2,2,4-tricyclohexylbutyl 2,2-dicyclohexylacetate is converted to 2,2,4-tricyclohexyl-3-butenyl 2,2-dicyclohexylacetate; 2-methyl-3-hydroxy-2,4-di(paramethylphenyl)-pentyl 2-(para-methylphenyl)-propionate is dehydrated to 2 - methyl-2,4-di(para-methylphenyl)-3-pentenyl 2-(para-methylphenyl)-propionate; 3-hydroxy-2,2,4,4 - tetra(para-methylphenyl)butyl 2,2 - di(para-methylphenyl) acetate is converted to 2,2,4,4-tetra(para-methylphenyl)-3-butenyl 2,2-di(para-methylphenyl)-acetate; and other monoester of 2,2,4-trisubstituted-1,3-diols not listed herein are converted to the corresponding esters of unsaturated 2,2,4-trisubstituted alcohols.

Thus, this invention provides a simple and direct process for producing carboxylic acid esters of unsaturated 2,2,4-trisubstituted alcohols from the corresponding saturated 2,2,4-trisubstituted-1,3-diol monoesters.

Other advantages, features and embodiments of this invention will occur to those in the exercise of ordinary skill in the art upon reading the foregoing specification. In this connection, while this invention has been described in detail with reference to specific embodiments thereof, variations and modifications thereof can be effected within the spirit and scope of the invention as described and claimed.

The embodiments of the invention in which an exclusive property or privilege is claimed are defined as follows:

1. A process for making an ester of an unsaturated 2,2,4-trisubstituted alcohol of the formula

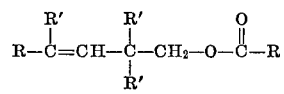

wherein each R is a radical independently selected from the group consisting of hydrogen and R' radicals and each R' is a radical independently selected from the group consisting of alkyl, cycloalkyl, aryl, alkylaryl and arylalkyl radicals, which comprises: contacting a glycol monoester of the formula

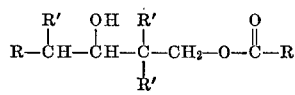

wherein R and R' are as specified above with a highly acidic, nonvolatile compound selected from the group consisting of sulfuric acid, alkyl and aryl sulfates, alkyl and aryl sulfonic acids, phosphoric acid, alkyl and aryl phosphates, alkyl and aryl phosphonic acids, alkyl and aryl phosphinic acids, pyrophosphoric acid, meta phosphoric acid and acetylsulfoacetic acid at a catalytic concentration for a period of about 2 to about 24 hours at a temperature of about 90° C. to about 160° C.

2. A process according to claim 1 wherein R' is an alkyl group having one to about eight carbon atoms.

3. A process according to claim 2 wherein the concentration of said highly acidic, nonvolatile compound is about 0.03 to about 3%.

4. A process according to claim 3 wherein said contacting period is substantially 4 to 8 hours and said temperature is from about 110 to about 135° C.

5. A process according to claim 4 wherein said highly acidic, nonvolatile compound is sulfuric acid, phosphoric acid, p-toluene sulfonic acid, pyrophosphoric acid, chloronaphthalene sulfonic acid, acetyl, sulfoacetic acid, ethyl phosphate or trifluoromethane phosphoric acid.

6. A process according to claim 5 wherein the glycol monoester is 3-hydroxy-2,2,4-trimethylpentyl isobutyrate and the ester of an unsaturated 2,2,4-trisubstituted alcohol is 2,2,4-trimethyl-3-pentenyl isobutyrate.

7. A process according to claim 5 wherein the glycol monoester is 2-ethyl-3-hydroxy-2,4-dimethylhexyl 2-methylbutyrate and the ester of an unsaturated 2,2,4-trisubstituted alcohol is 2-ethyl-2,4-dimethyl-3-hexenyl 2-methylbutyrate.

8. A process according to claim 5 wherein the glycol monoester is 3-hydroxy-2,2,4-trimethylpentyl acetate and the ester of an unsaturated 2,2,4-trisubstituted alcohol is 2,2,4-trimethyl-3-pentenyl acetate.

9. A process according to claim 5 wherein the glycol monoester is 2-ethyl-3-hydroxy-2,4-dimethylhexyl acetate and the ester of an unsaturated 2,2,4-trisubstituted alcohol is 2-ethyl-2,4-dimethyl-3-hexenyl acetate.

10. A process according to claim 5 wherein the glycol monoester is 2-ethyl-3-hydroxy-2,4-dimethylhexyl isobutyrate and the ester of an unsaturated 2,2,4-trisubstituted alcohol is 2-ethyl-2,4-dimethyl-3-hexenyl isobutyrate.

References Cited

UNITED STATES PATENTS 2,226,645   12/1940   Thomas _____ 260—486

LORRAINE A. WEINBERGER, *Primary Examiner.*

V. GARNER, *Assistant Examiner.*

Washington, D.C. 20231

UNITED STATES PATENT OFFICE
CERTIFICATE OF CORRECTION

Patent No. 3,408,388            October 29, 1968

Hugh John Hagemeyer, Jr., et al.

It is certified that error appears in the above identified patent and that said Letters Patent are hereby corrected as shown below:

Column 3, line 15, "dibenzylposphinic" should read -- dibenzylphosphinic --.
Column 7, line 63, "Zinc" should read -- Zinc chloride --.

Signed and sealed this 10th day of March 1970.

(SEAL)
Attest:

Edward M. Fletcher, Jr.
Attesting Officer

WILLIAM E. SCHUYLER, JR.
Commissioner of Patents